UNITED STATES PATENT OFFICE.

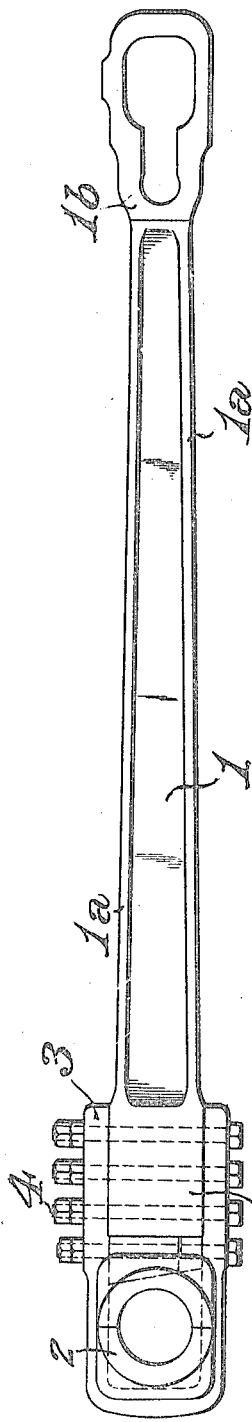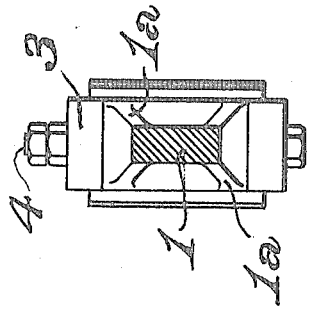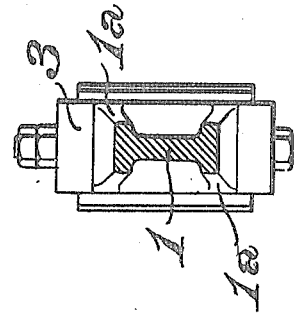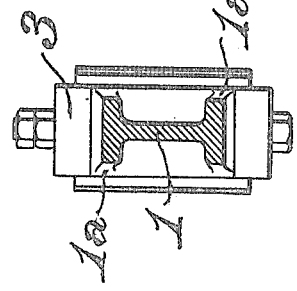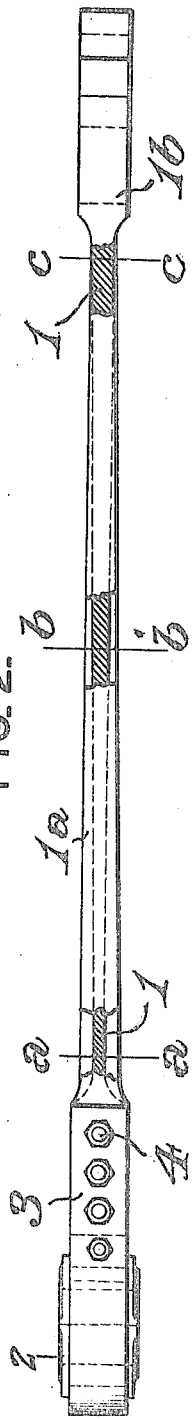

WILLIAM E. WOODARD, OF SCHENECTADY, NEW YORK.

CONNECTING-ROD.

1,208,263.

Specification of Letters Patent.

Patented Dec. 12, 1916.

Application filed October 11, 1916. Serial No. 124,992.

*To all whom it may concern:*

Be it known that I, WILLIAM E. WOODARD, of Schenectady, in the county of Schenectady and State of New York, have invented a certain new and useful Improvement in Connecting-Rods, of which improvement the following is a specification.

My invention relates generally to means for linking a reciprocating member of a motor or other mechanism to a rotating member thereof, as, for example, a cross head and a crank pin of a fluid pressure engine, and more particularly to main connecting rods for locomotives designed to exert very heavy power, in many of which, where it occurs that the lateral clearance for the front crank pins is limited, difficulty is experienced in obtaining it, sufficiently for the passage of the front or intermediate crank pins behind the main rods. This condition is usually met by spreading the cylinder centers or recessing the front or intermediate crank pins into the hubs of the driving wheels, neither of which expedients is desirable if a satisfactory alternative is obtainable.

The object of my invention is to provide a main connecting rod of such construction as will enable the planes of the side or coupling rods leading forward from the main driving wheels, to be brought as close as possible to the central planes of the main rods, and in which, while the centrifugal and lateral bending stresses are kept within normal limits, a minimum width of section is provided at the points where the crank pins forward of the main driving wheel pass behind the main rods.

The improvement claimed is hereinafter fully set forth.

In the accompanying drawing: Figure 1 is a side view, in elevation, of a locomotive main connecting rod, illustrating an embodiment of my invention; Fig. 2, a plan or top view thereof; and, Figs. 3, 4 and 5, transverse sections, on an enlarged scale, on the lines *a a*, *b b*, and *c c*, respectively, of Fig. 2.

In the specific embodiment of my invention which is herein exemplified, it is shown as applied in a connecting rod, the body of which is of I section, comprising a vertical web, 1, and top and bottom lateral flanges, 1ª, and which has stubs or enlargements, 1ᵇ and 1ᶜ, formed on its ends, suitably adapted to be coupled to a cross head pin and to a crank pin, respectively, in the usual manner. The construction thus far described is one which is, and has been for some time past, standard in locomotive engines.

In the practice of my invention, the web, 1, of the body of the rod is made of normal section at the rear or crank pin stub end, 1ᶜ, and is thence gradually laterally tapered or increased in thickness, to the full width of the rod at the front or cross head pin stub end. The top and bottom flanges, 1ª, of the body are gradually laterally tapered or outwardly inclined in the opposite direction, that is to say, they merge into the web at the cross head stub end, and are of maximum width at the opposite end. The connecting rod is thus of I section at its rear stub end, and of rectangular section at its front end, the former section being gradually converted into the latter, as shown by the transverse sections, Figs. 3, 4 and 5.

In the instance shown, the rear end of the connecting rod is of the block and strap type, the crank pin brasses, 2, being held in position against the stub end, 1ᶜ, by a strap, 3, and bolts, 4, in the usual manner. It will, however, be seen that my invention is entirely independent of the form of the stub ends of the rod, and is therefore equally applicable in solid ended rods, which are in general use, and in which a separate strap is dispensed with.

The above described novel disposition of the metal forming the body of the connecting rod, enables its width to be reduced to the minimum at the cross head end, without impairment of its capacity to safely sustain the stresses to which it is subjected in operation, and without involving any increased difficulty or expense in the manufacture of the rod.

I claim as my invention and desire to secure by Letters Patent:

1. As a new article of manufacture, a connecting rod, the body of which is progressively tapered or inclined from an I section at its crank pin stub end to a rectangular section at its cross head stub end.

2. As a new article of manufacture, a connecting rod having crank pin and cross head stubs at its opposite ends, and an intermediate body which is of I section at the crank pin stub and rectangular section at the cross head stub.

3. As a new article of manufacture, a connecting rod having crank pin and cross head stubs at its opposite ends, and an intermediate body, comprising a vertical web which progressively increases in width from the crank pin stub to the cross head stub, and upper and lower flanges which progressively increase in width from the cross head stub to the crank pin stub.

WILLIAM E. WOODARD.

Witnesses:
WILLIAM D. GRANT,
SMITH W. TYLER.